US006797918B1

(12) United States Patent
Higgins

(10) Patent No.: US 6,797,918 B1
(45) Date of Patent: Sep. 28, 2004

(54) RAIL CLEANING METHOD AND APPARATUS

(75) Inventor: Malcolm Higgins, Lee-on-the-Solent (GB)

(73) Assignee: Laserthor Limited, Hampshire (GB)

( * ) Notice: Subject to any disclaimer, the term of this patent is extended or adjusted under 35 U.S.C. 154(b) by 0 days.

(21) Appl. No.: 10/111,381

(22) PCT Filed: Oct. 30, 2000

(86) PCT No.: PCT/GB00/04146

§ 371 (c)(1),
(2), (4) Date: Aug. 1, 2002

(87) PCT Pub. No.: WO01/32990

PCT Pub. Date: May 10, 2001

(30) Foreign Application Priority Data

Nov. 1, 1999 (GB) ............................................ 9925747
Oct. 26, 2000 (GB) ............................................ 0026180

(51) Int. Cl.$^7$ ............................................ B23K 26/00
(52) U.S. Cl. ............................ 219/121.69; 219/121.68
(58) Field of Search ...................... 219/121.69, 121.68, 219/121.85

(56) References Cited

U.S. PATENT DOCUMENTS

| | | | | |
|---|---|---|---|---|
| 4,063,063 A | * | 12/1977 | Funck et al. | 219/121.76 |
| 5,151,134 A | | 9/1992 | Boquillon et al. | |
| 5,194,723 A | * | 3/1993 | Cates et al. | 250/205 |
| 5,780,806 A | * | 7/1998 | Ferguson et al. | 219/121.68 |
| 6,288,362 B1 | * | 9/2001 | Thomas et al. | 219/121.84 |

FOREIGN PATENT DOCUMENTS

| | | | | |
|---|---|---|---|---|
| DE | 43 23 700 | | 1/1995 | |
| DE | 4323700 | * | 1/1995 | B60B/39/00 |
| DE | 195 42 872 | | 1/1997 | |
| DE | 198 04 834 | | 8/1999 | |
| JP | 1-136865 | | 5/1989 | |
| JP | 1136865 | * | 5/1989 | B61C/15/08 |

* cited by examiner

*Primary Examiner*—M. Alexandra Elve
(74) *Attorney, Agent, or Firm*—Bacon & Thomas, PLLC

(57) ABSTRACT

A method of cleaning a rail by removing contaminants from the surface of the rail comprises generating a high intensity pulsed laser beam and directing the laser beam onto the surface of the rail so as to destroy at least part of the contaminants. Preferably the parameters of the laser beam are selected so that the contaminants are destroyed by being converted directly into gases. The temperature of the contaminants may be raised to at least 6000 degrees Celsius. Apparatus cleaning a rail by removing contaminants from the surface of the rail comprises means for generating a high intensity pulsed laser beam and means for directing the laser beam onto the surface of the rail so as to destroy at least part of the contaminants. Preferably the apparatus comprises means for selecting the parameters of the laser beam so that the contaminants are destroyed by being converted directly into gases. The temperature of the contaminants may be raised to at least 6000 degrees Celsius.

24 Claims, 3 Drawing Sheets

RAIL CLEANING METHOD AND APPARATUS

Figure 1:
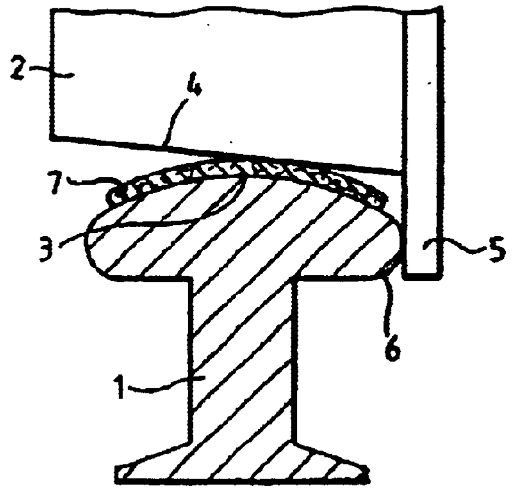

The present invention relates to a method and apparatus for cleaning rails by removing contaminants such as leaves, lubricating oil, fuel oil, grease, water and ice coated onto the rails. The invention has a particular application in cleaning the rails of a rail system. The term "rail system" as used herein encompasses all systems in which wheeled vehicles travel on rails, and in particular railway systems for trains, and tramway, plateway and monorail systems and similar systems.

It is known that, due to the movement of trains in a railway system adjacent to piles of leaves, appreciable amounts of the leaves may be transferred to the top surfaces of the rails and, once there, are compacted by the wheels of the trains into a hard coating on the tops of the rails. Further, lubricating oil, fuel oil and grease may be transferred from the trains to the rails, and water and ice may form on the rails by precipitation from the atmosphere or otherwise to form softer coatings. The term "train" as used herein encompasses all forms of railway rolling stock, trams, monorail rolling stock and all vehicles design to travel on rails.

The presence of the hard coating of contaminants such as leaves or the softer coating of contaminants such as lubricating oil, fuel oil, grease, water or ice has two important effects. Firstly, it decreases the traction between the driving wheels of the trains and the rails and, secondly, it forms an electrically insulating layer which prevents continuous electrical connection between the wheels of the train and the rails.

It is known to use special electrical apparatus which continuously detects the positions of trains in a railway system and sends signals to a control centre so that the position of each train in the railway system can be indicated on a display board in the control centre. The correct operation of the special electrical apparatus depends on the establishment and the maintenance of a continuous electrically conducting path between at least some of the wheels of each train and the rails. The presence of a hard or soft coating of contaminants as described above on the tops of the rails destroys this electrically conducting path and prevents the correct operation of the special electrical apparatus which indicates the position of each train in the railway system.

From a safety point of view it is essential that the position of each train in a railway system should be known all the time to ensure that signals are set correctly, that a train does not appear to pass through a danger signal, that each train is in the correct position in the railway system and that two or more trains arc not on a collision course. It is therefore very important that the above described special electrical apparatus operates continuously to provide all the above information about each train.

It is known to try to remove contaminants of the above type. Various methods and apparatus have been used and proposed, including mechanical devices and processes and chemical devices and processes. These devices and processes are not always effective to remove or destroy the contaminants and operate only relatively slowly. Therefore, if a device or process of these types is incorporated into a train moving along the rails which are covered with the contaminants the train can only travel slowly. Performing the operation at this speed of movement severely holds up passenger and freight trains which cannot move until the contaminants have been completely removed from the rails.

The above problems due to contaminants on the surfaces of the rails of railway systems occur also in tramways, plateways and monorail systems and similar systems.

Patent Specification DE 43 23 700 (Document D1) describes the use of a laser beam to "evaporate" a layer of a contaminant such as water, snow, ice etc. on a metal substrate such is a rail and to remove the vapour by a jet of air etc. The temperature to which the contaminant is raised is not specified.

Patent Specification U.S. Pat. No. 4,063,063 (Document D2) describes the use of a laser beam to "looser" a hard layer of contaminant such as an oxide on a metal substrate. The loosened contaminant is then removed from the substrate by a mechanical or a chemical process.

Patent Specification DE 195 42 872 (Document D3) describes the use of a laser beam to detect a contaminant such as oil or water on a substrate. The laser beam is not used to remove or destroy the detected contaminant.

The object of the present invention is to provide an improved method and apparatus for cleaning the rails of a rail system by removing contaminants on the surfaces of the rails, preferably at a speed close to or at the normal speeds of the vehicles travelling on the particular rail system being treated.

According to one aspect of the present invention a method of cleaning a rail by removing contaminants from the surface of the rail comprises generating a high intensity pulsed laser beam and directing the laser beam onto the surface of the rail so as to destroy at least part of tho contaminants.

The temperature of the contaminants may be raised to at least 6000 degrees Celsius.

According to another aspect of the invention apparatus for cleaning a rail by removing contaminants from the surface of the rail comprises means for generating a high intensity pulsed laser beam and for directing the laser beam onto the surface of the rail so as to destroy at least part of the contaminants.

By using a high intensity pulsed laser beam which converts the contaminants directly into gases the destruction of the contaminants takes place very quickly. If the rail is part of a rail system on which vehicles run, the laser beam generating system may be mounted on one of the vehicles and operated while the vehicle is running. Since the destruction of the contaminants takes place quickly, it is expected that the vehicle can be run at normal speeds while the destruction process takes place.

If the contaminants extend as a coating on the surface of the rail the laser beam may be directed successively al different parts of the coating to result in the gradual destruction of all the coating.

The laser beam may alternatively be moved gradually along the rail, either to divide the coating gradually into two portions or to destroy all parts of the coating gradually.

The apparatus may include a shield to prevent the laser beam from being directed or reflected away from the surface of the rail. This will prevent the laser beam striking on any other surface spaced from the rail, in particular parts of a human body or an animal such as the eyes or anything else which would be damaged by the laser beam.

Figure 2:
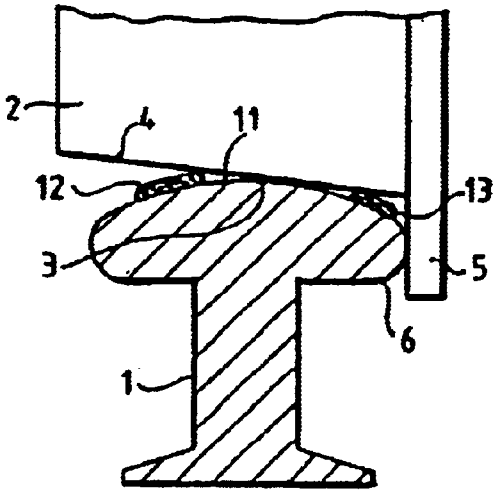
Figure 3:
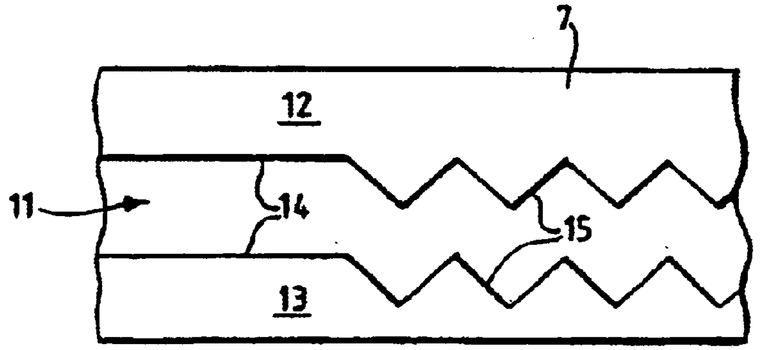
Figure 4:
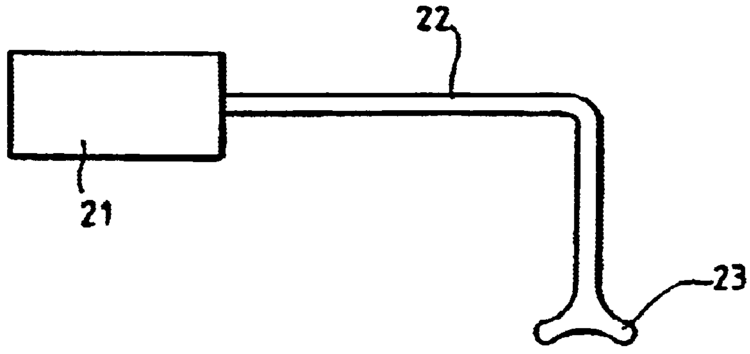
Figure 5:
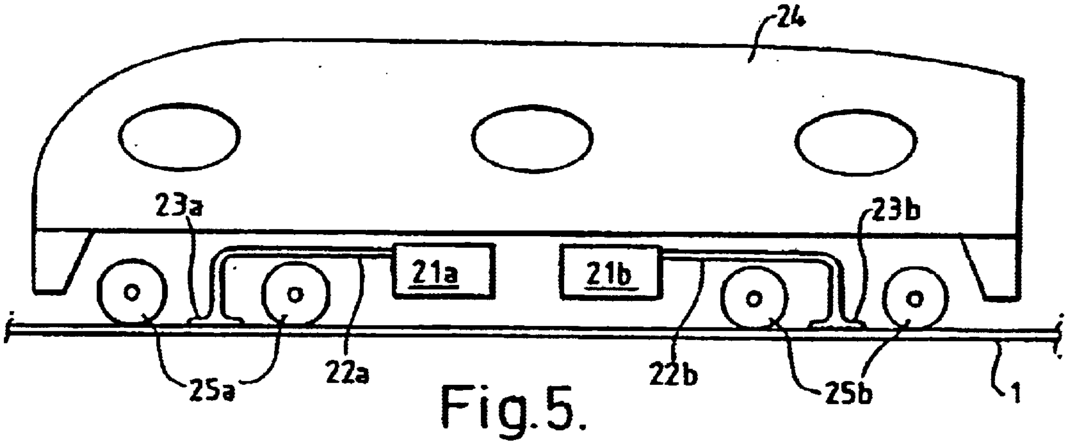
Figure 6:
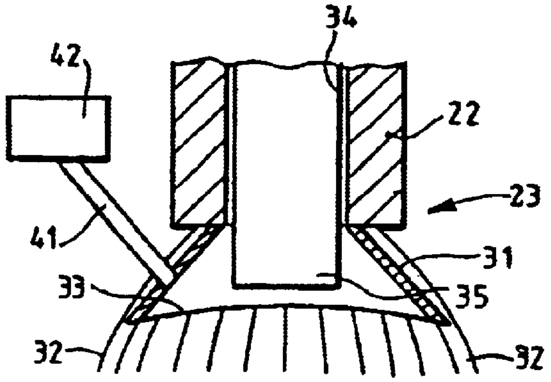
Figure 7:
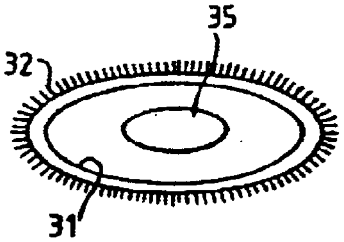
Figure 8:
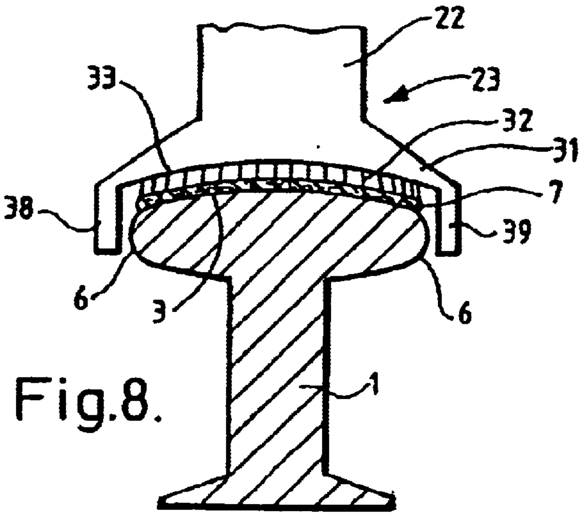
Figure 9:
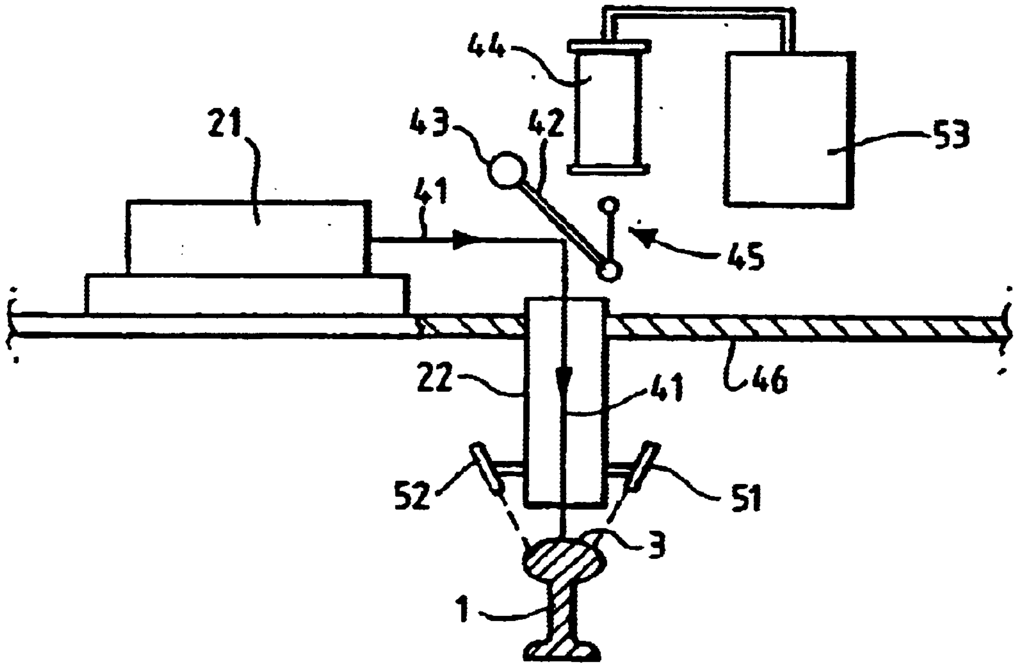
Figure 10:
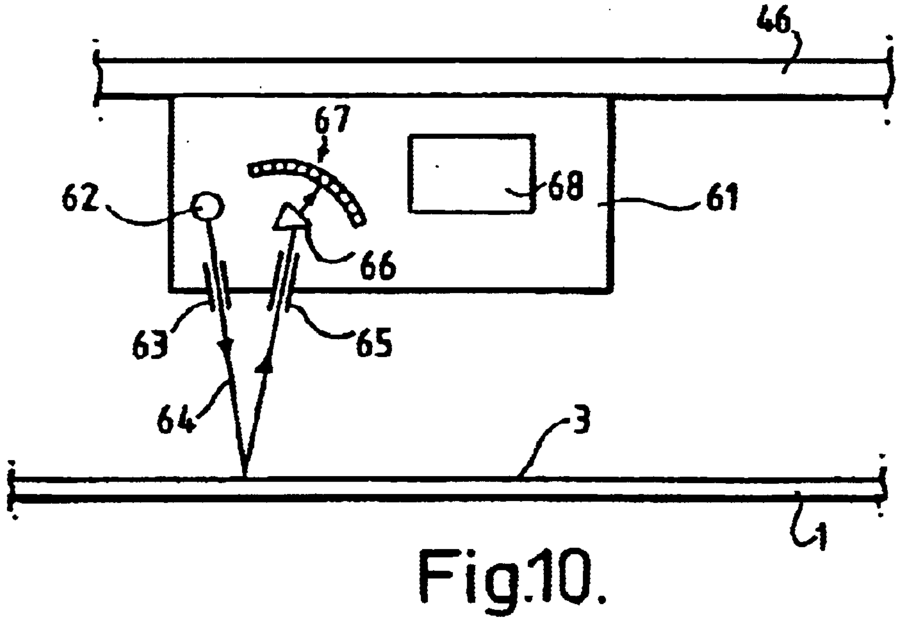

In order that the invention may be more readily understood an embodiment will now be described with reference to the accompanying drawings, in which:

FIG. 1 is an end view in section of a rail showing a coating on the top surface of the rail formed by a contaminant such as leaves, FIG. 2 is an end view in section of the rail illustrated in FIG. 1 showing the coating partially destroyed, FIG. 3 is a plan view of the rail shown in FIGS. 1 and 2 showing the coating divided into two parts, FIG. 4 is a diagram of a laser beam generating system, FIG. 5 is a diagram of a railway vehicle with the laser beam generating system illustrated in FIG. 4 installed, FIG. 6 is a side view partly in section and on a larger scale of one version of the working head of the laser beam generating system shown in FIG. 4 from which the laser beam in emitted, FIG. 7 is a view of the underneath of the working head illustrated in FIG. 6, FIG. 8 is an end view in section of the rail illustrated in FIGS. 1 and 2 showing how a modified version of the working head illustrated in FIGS. 6 and 7 can be fitted over the top and sides of the rail and the coating of a contaminant, FIG. 9 is a diagrammatic view of apparatus for guiding the laser beam relative to the surface of a rail, and FIG. 10 is a diagrammatic view of apparatus for detecting the presence of contamination on the surface of a rail.

FIGS. 1 and 2 illustrate a rail 1 in a railway system adapted to support a wheel 2 of a railway engine, carriage, truck or other vehicle. The wheel 2 has an outer conical surface 4 and a flange 5. The top surface 3 of the rail 1 is slightly convex so that the outer conical surface 4 of the wheel 2 normally makes contact with the upper part of the top surface of the rail while the flange 5 of the wheel 2 extends downwardly over the side 6 of the rail. Leaves which have been picked up by the passage of the vehicle, or other contaminants such as lubricating oil, fuel oil, grease, water or ice, become formed into a coating 7 which extends over the top surface 3 of the rail. In the case of leaves or ice this coating 7 is likely to be hard. If the coating 7 is continuous, the outer conical surface 4 of the wheel 2 will not make contact with the surface 3 of the rail. If the coating 7 is electrically insulating there will not be electrical continuity between the wheel 2 and the rail 1.

As illustrated in FIGS. 2 and 3, if the coating 7 is hard and a sufficiently wide gap 11 is formed in the central part of the coating 7 dividing the coating into two side portions 12, 13 by destroying the central part of the coating 7 and exposing part of the top surface of the rails, the conical surface 4 of the wheel 2 will make contact with the exposed part of the top surface of the rail between the side portions 12, 13 of the coating. In these circumstances the electrical continuity between the wheel 2 and the rail 1 will be restored. Further, since the surface 4 of the wheel 2 makes contact with the two side portions 12, 13 of the hard coating 7, any subsequent movement of the wheel 2 along the rail 1 will cause the two side portions 12, 13 to break away from the top surface 3 and be destroyed.

As illustrated in FIG. 3 the gap 11 formed in the hard coating 7 can have substantially parallel sides as at 14 or can be formed in a zig-zag pattern as at 15.

FIG. 4 illustrates diagramatically a high intensity pulsed laser beam generating system the beam of which can be used, in accordance with the invention, to destroy contamination on the surface of the rail 1, or to destroy part of the hard coating 7 to form the gap 11. The system comprises a generator 21 for a pulsed laser beam and a transmitting tube 22 containing an optical fibre light path, or an alternative form of light path, including for example mirrors, for transmitting the laser beam to a working head 23. The transmitting tube 22 can be flexible and capable of being bent into any required shape so that the working head 23 can be moved into a required position. In an alternative arrangement the tube 22 can be straight, in which case it will not need to contain an optical fibre path or any other light path including for example mirrors.

The parameters of the laser beam generating system 21 are preferably selected so that the coating 7 of contaminants, whether solids or liquids, is destroyed by being converted directly into gases, the process known as "ablation". This physical process involves the application of intense heat for significantly less than a millionth of a second to raise the temperature of the contaminants to at least 6000 degrees Celsius. This causes solids to turn substantially instantaneously into gases without going through a liquid stage, and causes liquids to turn substantially instantaneously into gases.

In a practical embodiment, the system 21 includes an Nd:YAG (neodyimium-yttrium-aluminium-garnet) laser generating a pulsed beam. The length of each pulse is between 15 and 50 nanoseconds. The pulse repetition rate is 50 pulses per second. The wavelength of the radiation in the laser beam is between 800 and 1400 nanometers. This puts the radiation in the infrared region which is necessary when the contaminants do not absorb a substantial amount of visible light.

The energy in each pulse is 1 joule. This gives an average power of the laser beam of 50 watts. The peak power with a 10 nanosecond pulse length is 100 megawatts. The laser beam energy per pulse per unit area is 0.5 to 2.0 joules per centimeter squared. The laser beam is focused to a beam diameter of 8 to 15 millimeters.

A laser beam generating system having the above parameters will remove by ablation a coating of contaminants (oil, grease, leaf residue and other general rail head contaminants) of less than 1 millimeter thickness and 1.25 centimeters width on the surface 3 of the rail 1. It is expected that, if a laser beam generating system as described above is mounted on a railway vehicle (see description below referring to FIG. 5), a coating 7 of contaminants as above will be destroyed while the vehicle is travelling at speeds of up to 45 miles per hour.

This type of laser beam generating system can be used to form the gap 11 in the central part of a hard coating 7 of contaminants as illustrated in FIGS. 2 and 3 or to destroy the whole coating. The system can also be use to destroy part or all of a softer or liquid coating of contaminants.

FIG. 5 illustrates how two laser beam generating systems 21*a*, 21*b* of the type illustrated in FIG. 4 can be mounted on a railway vehicle 24 having two sets of bogie wheels 25*a*, 25*b*. The two laser beam generating systems 21*a*, 21*b* are located below the main body of the vehicle 24, which may be an engine, carriage or truck, and the two transmitting tubes 22*a*, 22*b* are positioned so that one tube extends to the front set of bogie wheels 25*a* and the other tube extends to the rear set of bogie wheels 25*b*. The working heads 23*a*, 23*b* are positioned close to the top surface of the rail 1 on which the vehicle 24 is supported and between the pairs of bogie wheels in each set so that they provide a clear path for the laser beam to the surface of the rail and minimise the effect of lateral vehicle movement relative to the rail on the position that the laser beam strikes the surface of the rail. The laser beam generating system 24 can alternatively be attached in a similar way to a vehicle having arrangements of wheels other than bogies.

FIG. 6 is a side view in section and FIG. 7 is a view from underneath of one version of the working head 23. The laser beam transmitting tube 22 is attached to an elongated conical end portion 31. Extending around the outer surface of the conical end portion 31 is a set of brushes 32 the ends of which project beyond the lower end 33 of the conical end portion 31. An optical fibre 34 (if included) is housed in the tube 22 and projects at 35 into the conical end portion 31. In operation the pulsed laser beam generated in the generating system 21 is emitted from the end 35 of the optical fibre 34, or directly from the end of the tube 22.

As illustrated in FIG. 8, which includes an end view in section of a rail 1, the head 23 is shaped so as to fit closely over the top surface 3 of the rail 1 so that the ends of the brushes 32 just make contact with the surface 3 or the top surface of the hard coating 7. It will be seen that, in side view, the lower end 33 of the conical portion 31 is curved so that it conforms to the curve of the top surface 3 of the rail 1. In the version of the head 23 illustrated in FIG. 8 the sides of the conical end portion 31 of the head extend downwards at 38, 39 to cover the sides 6 of the rail 1. The extensions 38, 39 can be made of rubber or another flexible material.

In operation, when the laser beam is emitted from the end 35 of the optical fibre, or directly from the tube 22, it is arranged to fall on the top surface of the coating 7 of leaves or other contaminant. In doing so the laser beam will very quickly destroy the parts of the coating on which it falls. If the contaminant is leaves, the coating 7 will be hard and will be quickly vaporised leaving a central gap 11 between the two side portions 12, 13 of the hard coating, as illustrated in FIGS. 2 and 3. If the contaminant is liquid or ice, the coating 7 will not be so hard and will be quickly vaporised in whole or in part. The laser beam may be directed to spaced apart portions of the coating 7 in succession or may be moved continuously over the coating 7.

With reference to FIG. 6 the head 23 can include a tube 41 extending from the conical portion 31 and supplied with air under pressure from a source 42. The air passes into the conical portion 31 and forces the material of the coating which has been vaporised out of the conical portion 31. Alternatively, the source 42 can be of low pressure air and the tube 41 used to extract the vaporised material from within the conical portion 31.

The laser beam emitted from the end 35 of the optical fibre 34, or the tube 22, can be moved by an electrical or mechanical device (see below as described with reference to FIG. 9) so that the gap 11 in the hard coating 7 can be formed with parallel sides 14 or can be formed in a zig-zag shape 15, as illustrated in FIG. 3.

The set of brushes 32 is sufficiently dense and fits closely to the top surface 3 of the rail 1 so that the laser beam is prevented from emerging from the region in which the destruction of the coating 7 is taking place and striking unwanted surfaces or people or animals. In the arrangement illustrated in FIG. 8 the downwardly extending sides 38, 39 of the conical portion 31 also serve to prevent the laser beam from emerging from the region in which the destruction of the coating 7 is taking place.

When the laser beam generating system 21 is used on a vehicle in a rail system to remove contaminant from the surfaces of the rails, the laser beam emitted from the head is set to impinge upon the correct portion of the rail surface. If the track of the rails is relatively straight and the vehicle is moving relatively slowly, the position of the laser beam will not need any further adjustment. At higher speeds or on a track with pronounced curves, a control system is required to keep the laser beam correctly aimed at the rail 1 and the coating of contaminant to be removed. FIG. 9 illustrates diagammatically a suitable control system designed to be included in a laser beam generating system 21 as described above and carried on a rail vehicle in a rail system.

With reference to FIG. 9, the laser beam generating system 21 carried on the vehicle projects a laser beam 41 in a generally horizontal direction onto a plane mirror 42 which is hinged horizontally at 43 and can be rotated about the hinge 43 by a voice coil solenoid 44 through a linkage 45. The position of the mirror 42 controls the point at which the beam 41 strikes the surface 3 of the rail 1. The beam 41 travels through the floor 46 of the vehicle along a shielding tube 22 which extends through the floor 46. Two proximity sensors 51, 52 are illustrated as being mounted on the tube 22 but could alternatively be mounted on any other convenient part of the structure of the vehicle 24. The sensors 51, 52 can be any well known type of device suitable for detecting the position of the surface 3 of the rail 1, for example devices using ultrasonic radiation or inductive or capacitative effects.

The sensors 51, 52 provide electrical signals indicating the position of the rail 1 relative to the vehicle 24. These signals are conveyed by suitable conductors (not shown) to a servo amplifier 53 which produces a high powered electrical output signal proportional to the amount of movement of the laser beam 41 required for it to strike the surface 3 of the rail 1 in the required position. This output signal is supplied to the solenoid 44 which rotates the mirror 42 through the linkage 45 to change the direction of the laser beam. Thus, when the vehicle 24 moves laterally relative to the rail 1 as it moves along the rail, the direction of the beam 41 is adjusted so that the beam continues to impinge upon the required part of the surface 3 of the rail 1.

By introducing an additional oscillating signal into the servo amplifier 53 the laser beam 41 can be made to oscillate so as to form the gap 11 in the coating 7 of contaminant as illustrated in FIG. 3.

The above described apparatus for removing coatings of contaminants on the surface 3 of the rail 1 can be operated continuously or can be controlled by a suitable control system so as to operate only when there are contaminants on the surface. FIG. 10 is a diagrammatic view of one type of control system for detecting the presence of contaminants on the surface of a rail and controlling the operation of the apparatus for destroying the contaminants.

With reference to FIG. 10 the control system comprises an equipment enclosure 61 mounted under the floor 46 of the vehicle 24. This may be the same enclosure as that which contains the laser beam generating system 22 or it may be a separate enclosure. The enclosure 61 contains a light source 62 and a tube 63 which directs a light beam 64 from the source 62 to the surface 3 of the rail 1 at which the beam is reflected. Another tube 65 collects the reflected beam and passes it to a prism 66 which forms part of a spectrometer A spectrometer is an instrument used to determine the quantities of light of each wavelength in a composite light beam. If the composite light beam is passed through a prism, such as the prism 66, light of each wavelength is refracted through a different angle. In the arrangement illustrated the prism 66 is fixed in position and a plurality of light sensors 67 are arranged around the prism 66 in a circular array so as to receive each of the refracted light beams simultaneously. Each sensor 67 is adapted to receive and measure light of a different wavelength. In an alternative arrangement the prism 66 can be equipped with mechanical devices to rotate it, and a single light sensor rotating with the prism is arranged to receive and measure each refracted beam of light of different wavelength in turn.

It is known that the identity of many substances can be determined by the analysis of the wavelengths of the light in a composite beam reflected off the surface of an object made from the substance by using a spectrometer as described above. Substances possess unique "signatures" represented by the amounts of light of different wavelengths reflected off their surfaces when irradiated with a light beam of a particular composition of wavelengths. If the light source 62 is arranged to produce a light beam of a particular composition of wavelengths and this composite beam is directed onto the surface 3 of the rail 1 and reflected back to the prism 64, by analysing the outputs of the sensor or sensors 67 described above it will be possible to determine if the light beam has been reflected off the surface of a coating of leaves or other contaminants, since each contaminant will have a different "signature".

The outputs from the sensor or sensors 67 are supplied to a control unit 68 which determines the nature of the substance from which the light beam has been reflected and sends a signal to the laser beam generating system 22 causing it to switch ON when the contaminant is detected and to switch OFF when no such contaminant is detected.

What is claimed is:

1. A method of cleaning a rail by removing contaminants from the surface of the rail comprising generating a high intensity pulsed laser beam and directing the laser beam onto the surface of the rail so as to destroy at least part of the contaminants, wherein the contaminants extend as a coating on the surface of the rail and the rail is part of a rail system on which vehicles run on wheels, and further comprising the steps of destroying part of the coating so as to leave at least two spaced apart portions of the coating, and using the wheel of a vehicle to destroy the two spaced apart portions of the coating.

2. A method as claimed in claim 1 comprising selecting the parameters of the laser beam so that the contaminants are destroyed by being converted directly into gases.

3. A method as claimed in claim 2 comprising raising the temperature of the contaminants to at least 6000 degrees Celsius.

4. A method as claimed in claims 1, 2 or 3 comprising preventing the laser beam from being directed or reflected away from the surface of the rail in a selected direction.

5. Apparatus for cleaning a rail by removing contaminants from the surface of the rail comprising a laser beam generator arranged to generate a high intensity pulsed laser beam; a directing device arranged to direct the laser beam onto the surface of the rail so as to destroy at least part of the contaminants; a contaminant detection device arranged to detect contaminants on the rail and to provide an output signal when contaminants are detected; and a control system responsive to said output signal arranged to operate said laser beam generating means.

6. Apparatus as claimed in claim 5 comprising a control system arranged to permit selection of the parameters of the laser beam so that the contaminants are destroyed by being converted directly into gases.

7. Apparatus as claimed in claim 6, wherein said control system is arranged to enable raising the temperature of the contaminants to at least 6000 degrees Celsius.

8. Apparatus as claimed in any one of claims 5, 6 or 7 adapted for use in removing contaminants extending as a coating on the surface of the rail comprising a control system arranged to enable the laser beam to destroy part of the coating so as to leave at least two spaced apart portions of the coating.

9. Apparatus as claimed in claims 5, 6 or 7, including a laser shield arranged to prevent the laser beam from being directed or reflected away from the surface of the rail in a selected direction.

10. Apparatus as claimed in claims 5, 6 or 7, adapted for use in cleaning a rail which is part of a rail system on which vehicles run, wherein said laser beam generator and said directing device are mounted on a vehicle adapted to run on such rail system.

11. Apparatus as claimed in claim 10 comprising a control system arranged to control the direction of the laser beam while the vehicle is moving along the rail so as to ensure that the laser beam is substantially continuously directed to a selected part of the surface of the rail.

12. A method of cleaning a rail by removing contaminants from the surface of the rail comprising generating a high intensity pulsed laser beam and directing the laser beam onto the surface of the rail so as to destroy at least part of the contaminants, including the step of selecting the values of the parameters of the laser beam so that the contaminants are destroyed by being converted directly into gases, and further including, in the selecting step, the step of selecting the value of at least one of the following parameters of the laser beam: the length of each pulse, the pulse repetition rate, the wavelength of the radiation, the energy in each pulse, the average power of the laser beam, the peak power of the laser beam, the laser beam energy per pulse per unit area, and the size of the laser beam when it strikes the contaminants.

13. The method as claimed in claim 12 wherein, as a result of directing the pulsed laser beam onto the surface of the rail, the temperature of the contaminants is raised to at least 6000 degrees Celsius.

14. The method as claimed in claim 12, wherein the contaminants extend as a coating on the surface of the rail, comprising destroying part of the coating so as to leave at least two spaced apart portions of the coating.

15. The method as claimed in claim 14 in which the rail is part of a rail system on which vehicles run on wheels comprising using the wheel of a vehicle to destroy the two spaced apart portions of the coating.

16. The method as claimed in claim 12, comprising preventing the laser beam from being directed or reflected away from the surface of the rail in a selected direction.

17. Apparatus for cleaning a rail by removing contaminants from the surface of the rail comprising means for generating a high intensity pulsed laser beam and for directing the laser beam onto the surface of the rail so as to destroy at least part of the contaminants, and further including means for selecting the values of the parameters of the laser beam so that the contaminants are destroyed by being converted directly into gases, wherein the means for selecting the values of the parameters of the laser beam selects the value of at least one of the following parameters; the length of each pulse, the pulse repetition rate, the wavelength of the radiation, the energy in each pulse, the average power of the laser beam, the peak power, the laser beam energy per pulse per unit area, and the size of the laser beam when it strikes the contaminants.

18. Apparatus as claimed in claim 17, wherein the laser beam is capable of elevating the temperature of the contaminants to at least 6000 degrees Celsius.

19. Apparatus as claimed in claim 17 or 18, wherein the contaminants extend as a coating on the surface of the rail comprising means for destroying part of the coating so as to leave at least two spaced apart portions of the coating.

20. Apparatus as claimed in claim 17 comprising means for preventing the laser beam from being directed or reflected away from the surface of the rail in a selected direction.

21. Apparatus as claimed in claim 17, wherein the rail is part of a rail system on which vehicles run, and in which the laser generating means and the laser directing means are mounted on a vehicle adapted to run on the rail system.

22. Apparatus as claimed in claim 17 comprising means for controlling the direction of the laser beam while the vehicle is moving along the rail so as to ensure that the laser beam is substantially continuously directed to a selected part of the surface of the rail.

23. Apparatus as claimed in claim 17 comprising means for detecting the contaminants on the rail and for providing an output signal when the contaminants are detected, and means responsive to said output signal to operate said laser beam generating means.

24. A method of cleaning a rail by removing leaf contaminants from the surface of the rail, comprising the steps of generating a high intensity pulsed laser beam and directing the laser beam onto the surface of the rail so as to destroy at least part of the leaf contaminants, the parameters of the laser beam being such that the contaminants are destroyed by being converted directly to gases.

* * * * *